Patented Apr. 4, 1939

2,152,786

UNITED STATES PATENT OFFICE 2,152,786

PREPARATION OF ACETOACETYL AROMATIC ACID AMIDES

Albert B. Boese, Jr., Pittsburgh, Pa., assignor to Carbide and Carbon Chemicals Corporation, a corporation of New York No Drawing. Application July 9, 1936, Serial No. 89,778

14 Claims. (Cl. 260—562)

This invention relates to the production of acetoacetyl aromatic acid amides by reacting diketene with an aromatic primary mono- or polyamine or substituted aromatic primary amine, in the presence of an inert volatile solvent for the reactants, and preferably a medium or a low-boiling inert solvent in which the acetoacetyl aromatic amide is quite soluble when hot, such as acetone, dioxan, benzene and toluene.

The production of acetoacetanilide by reacting aniline and diketene already is known; and the process therefor is covered in U. S. Patent 1,982,-675 issued December 4, 1934, to George H. Law.

It has now been discovered that by reacting diketene with the higher primary aromatic monoamines, primary aromatic poly-amines, and with substituted primary aromatic mono- and poly-amines, under conditions where the speed and violence of the reaction and the temperature of the reaction mixture is at all times under control, it is readily possible to produce acetoacetic acid amides from such amines and substituted amines in very satisfactory yields.

According to the invention, diketene and such a primary aromatic amine or substituted amine are slowly reacted in the presence of a solvent for the reactants which is inert with respect to each, and in which the resultant amide is soluble. Preferably the diketene is introduced slowly into an agitated solution of the amine in the inert solvent, at an elevated temperature which is desirably around the boiling point or refluxing point thereof. After completion of the reaction, the solvent is removed by distillation, and the acetoacetic acid amide is separated from any unreacted amine and recovered. Thus, notwithstanding the powerful polymerization tendency of diketene, and the high chemical reactivity of primary mono- and poly-amines and substituted amines, including those derived from aromatic hydrocarbons containing in their molecules two or more interconnected benzene nuclei, either condensed or uncondensed, it is possible,—by utilizing the present invention,—to prepare from these compounds valuable acetoacetyl aromatic amides with good yields and efficiencies.

Bis-para-amine derivatives of diphenyl and its homologues, amino diphenylmethane, $\alpha$ and $\beta$ naphthylamines and their homologues, and ar-alkyl amines such as benzylamine and its homologues, exemplify aromatic amines which react with diketene to yield these acetoacetyl amides.

The following examples serve to illustrate the invention:

EXAMPLE 1

Preparation of bis-acetoacetyl orthotolidine

A solution of 212 grams (1 mol) of orthotolidine in 2100 cc. of acetone was heated under reflux to the boiling point of acetone, and 176 grams (1.05 mol) of diketene was slowly added over a period of 15 minutes while constantly stirring the mixture. After approximately an hour the reaction product began to separate. Refluxing was continued for 3 hours and the reaction mixture, a free-flowing crystalline slush, was then allowed to stand overnight, and the crystallized product was separated by filtration. There thus was obtained 245 grams of bis-acetoacetyl orthotolidine which melted at 203° to 204° C. The filtrate was concentrated to half its original volume by distillation, cooled, and a further 29 grams of the bis-acetoacetyl orthotolidine, melting point 202° to 203° C., was obtained. On further concentration, an additional 63 grams of bis-acetoacetyl orthotolidine, melting point 201° to 202° C., was obtained which was separated by filtration and washed with acetone.

Thus a yield of diacetoacetyl tolidine of 88.7% was secured, based upon the orthotolidine, with a diketene efficiency of 84.9% based upon diacetoacetyl tolidine. Acetone was removed by distillation from the mother liquor from the final filtration and the residue treated with 200 cc. of a 5% aqueous sodium hydroxide solution. The caustic alkali-insoluble material, consisting chiefly of diacetyl orthotolidine, was separated by filtration. The filtrate was then acidified with 25 cc. of concentrated hydrochloric acid, and the precipitated diacetoacetyl orthotolidine separated on a filter, washed, and air dried. There was obtained an additional 8 grams of somewhat impure diacetoacetyl orthotolidine which melted at 195° to 200° C., increasing the total yield to 90.8%. As acidifying agents, other acids, such as sulfuric or acetic, may be used.

The reaction involved is indicated by the equation:

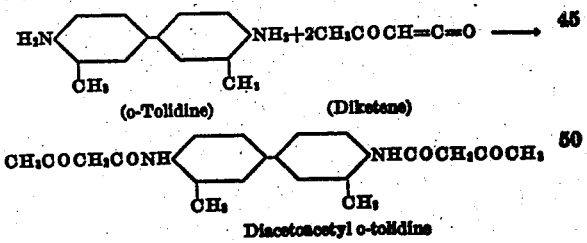

(o-Tolidine)    (Diketene)

Diacetoacetyl o-tolidine

Benzene, toluene and other aromatic hydrocarbons, dioxan, and other low or medium-boiling inert solvents may be used in place of the acetone. The use of acetone as the solvent is much preferred from a production viewpoint. The solubility of the orthotolidine in acetone is far greater than in toluene, etc. Moreover, when using acetone as a solvent, the reaction may be conducted at a low temperature, around 56° C., with good yields, while eliminating to a large extent the formation of byproducts.

EXAMPLE 2

*Preparation of bis-acetoacetyl benzidine*

To a solution of 36.8 grams of benzidine (bis-paradiamino-diphenyl) in 400 cc. of acetone was added slowly 35.3 grams of diketene. The solution then was heated under reflux with agitation for 4 hours, during which time a crystalline reaction product, diacetoacetyl benzidine, separated out. The mixture was cooled to room temperature and filtered. Thus there was obtained 57 grams of pure diacetoacetyl benzidine which melted with decomposition at 233° C. The acetone extract was evaporated, and yielded 10.6 grams of a caustic alkali-insoluble material. The residue was suspended in 100 cc. of warm acetone, and the resulting suspension filtered while warm. There was obtained 4.6 grams of acetone-insoluble diacetyl benzidine, melting at from 325° to 330° C. Concentration of the acetone filtrate yielded 4.2 grams of monoacetyl benzidine, melting at from 193° to 195° C. The percentage conversion of the benzidine was 80%; and the yield of the bis-acetoacetyl benzidine on the basis of the amount of benzidine that reacted was 97.5%.

EXAMPLE 3

*Production of acetoacet-alpha-naphthylamide*

To a cold solution of 8.4 grams of diketene in 50 cc. of dioxan was added in the cold a solution of 14.3 grams of alpha-naphthylamine in 50 cc. of dioxan. After 24 hours the odor of diketene had disappeared, and a portion of the reaction product had crystallized from the solution. Addition of petroleum ether caused a further precipitation. The crystallized reaction product was separated by filtration of the mixture, washed with petroleum ether, and then was recrystallized from benzene. A yield of over 90% was obtained of the acetoacet-alpha-naphthylamide in the form of almost colorless needles which melted at 118° to 120° C.

By introducing diketene to a refluxing solution of the alpha-naphthylamine in dioxan, the reaction may be completed in a shorter time.

The equation for the reaction may be written as follows:

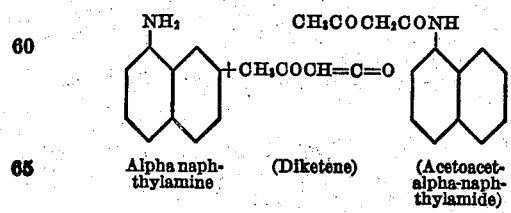

Alpha naphthylamine    (Diketene)    (Acetoacet-alpha-naphthylamide)

EXAMPLE 4

Under conditions substantially identical with those recited in Example 3, supra, but using beta-naphthylamine instead of alpha-naphthylamine, a yield of over 90% of aceto-acet-beta-naphthylamide, melting at 100° to 102° C., was produced and recovered.

The acetoacetyl aromatic acid amides of the invention are in general used in the dyestuff industry as intermediates for the production of dyes of the Hansa yellow type. They also, under ring closure in the presence of dehydrating agents, form hydroxymethyl quinoline derivatives. Di-aceto-acetyl tolidine, known as Naphthol As-G, is a commercially important dyestuff component.

The following examples illustrate the production of substituted acetoacetanilides in accordance with the invention:

EXAMPLE 5

*Para-hydroxy acetoacetanilide*

To a refluxing solution of 10.9 grams of para-amino-phenol in 150 cc. of acetone 8.4 grams of diketene was added dropwise. After refluxing the mixture for one hour, the acetone was removed by distillation, leaving 19 grams of viscous residue which slowly crystallized upon cooling. This product was purified by recrystallization from water after treatment of the water solution with decolorizing carbon. The reaction product, para-hydroxy acetoacetanilide, was recovered in the form of colorless needles which melted at between 88° and 90° C. This product is soluble in alcohols, ketones, esters and water, but only slightly soluble in ethers, chlorinated solvents, and aromatic and aliphatic hydrocarbons. It has the apparent structure designated by the formula

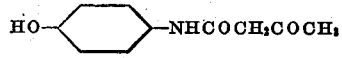

Para-hydroxy acetoacetanilide formed by the reaction of one mole of diketene with one of the amine.

EXAMPLE 6

*Para-nitroacetoacetanilide*

To a refluxing solution of 50 grams of para-nitroaniline in 600 cc. of acetone 33.4 grams of diketene were added dropwise. After refluxing the solution for 4 hours, the acetone was distilled off, and the resultant crystalline residue was treated with a dilute solution of the theoretical amount of sodium hydroxide for dissolving the resultant amide. The unreacted para-nitroaniline then was separated by filtration. The filtrate was neutralized with dilute hydrochloric acid, whereupon para-nitroacetoacetanilide precipitated. This was filtered off, washed with water, and air-dried, giving a yield of 65% thereof. When recrystallized from water it occurred as a pale yellow crystalline compound which melted at 124° to 124.5° C. It has the apparent structure indicated by the formula

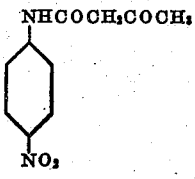

Para-nitroacetoacetanilide and is formed by the reaction of equimolecular proportions of the reactants.

EXAMPLE 7

*Para-ethoxy acetoacetanilide*

To a refluxing solution of 34 grams of para-phenetidine in 250 cc. of acetone was added slowly 21 grams of diketene. The heat developed by the resultant reaction was sufficient to keep the solution gently refluxing without external application of heat. When addition of the diketene was completed, the acetone was removed by distillation. The residue solidified upon cooling; and it was purified by recrystallization from a mixture of ethyl acetate and petroleum ether. Thus were obtained 48 grams of para-ethoxy acetoacetanilide, occurring as colorless needles melting at between 101° and 102° C., and corresponding to a yield of around 87.4%. This product has the apparent structure

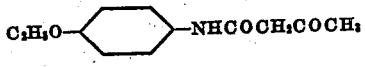

Para-ethoxy acetoacetanilide and results from the interaction of equimolecular proportions of the reactants.

EXAMPLE 8

Ortho-methoxy acetoacetanilide

Following the procedure described in Example 7 and using 31 grams of ortho-anisidine and 21 grams of diketene there were obtained 45 grams of ortho-methoxy acetoacetanilide in the form of colorless platelets, which melt at between 85° and 86° C., corresponding to a yield of around 87%. The compound has the apparent structure

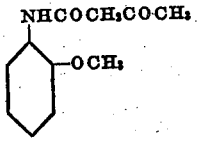

Ortho-methoxy acetoacetanilide

EXAMPLE 9

Diacetoacetyl meta-phenylene diamine

To a refluxing solution of 27 grams of meta-phenylene diamine in 250 cc. of acetone 47 grams of diketene were added dropwise. Thereafter the acetone solution was concentrated and cooled, whereupon an almost quantitative yield of diacetoacetyl meta-phenylene diamine crystallized out and was filtered off and air-dried. Upon recrystallization from glacial acetic acid, it occurred as a colorless crystalline compound that melted at between 107° and 108° C. and was soluble in water, alcohols, ketones, esters, and ethers, but was practically insoluble in chlorinated solvents and in aromatic and aliphatic hydrocarbons. It has the apparent structure

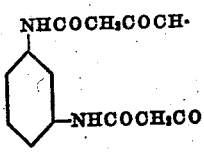

Diacetoacetyl meta-phenylene diamine

EXAMPLE 10

Diacetoacetyl para-phenylene diamine

Upon adding 46.2 grams of diketene slowly to a refluxing solution of 27 grams of para-phenylene diamine in 375 cc. of acetone an initial yield of 52 grams of diacetoacetyl para-phenylene diamine separated rapidly from solution, which was separated by filtration from the reaction mixture after cooling the latter. The filtrate upon further concentration yielded an additional 12 grams of this product, thereby providing a total yield of 92.5%; after purification by recrystallization with water it occurs as a lustrous pearl gray crystalline compound which melts at between 176° and 178° C. and has the apparent structure

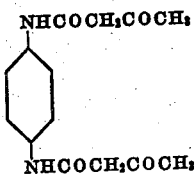

Diacetoacetyl para-phenylene diamine

It will be understood that the method of the present invention is not limited to the production of the particular acetoacetyl aromatic amides specifically recited in the specification. On the contrary, the method may be utilized for the production of acetoacetyl amides from other aromatic primary mono- and poly-amines of simple and condensed aromatic hydrocarbons, and from other substituted aromatic mono- and poly-amines.

By the expression "higher aromatic mono amines" appearing in the accompanying claims is intended to designate those primary amines having more than 6 carbon atoms in their molecules.

The invention is susceptible of modification within the scope of the appended claims.

I claim:

1. Method of preparing an acetoacetyl aromatic acid amide, which comprises reacting diketene and a primary amine selected from the group consisting of the aromatic mono amines having more than six carbon atoms in their molecules, the aromatic poly amines, and the substituted aromatic mono and poly amines, in the presence of a solvent inert to the reactants, separating from the reaction mixture the solid products thus formed, removing therefrom excess reactants, and recovering the resultant acetoacetyl amide.

2. Method of preparing an acetoacetyl aromatic acid amide, which comprises refluxing diketene and a primary amine selected from the group consisting of the aromatic mono amines having more than six carbon atoms in their molecules, the aromatic poly amines, and the substituted aromatic mono and poly amines, in the presence of a solvent inert to the reactants, separating from the reaction mixture the solid products thus formed, removing therefrom excess reactants, and recovering the resultant acetoacetyl amide.

3. Method as defined in claim 1, wherein acetone is employed as the said solvent.

4. Method of preparing bis-acetoacetyl o-tolidine, which comprises heating and reacting diketent with o-tolidine in solution in an inert solvent for the reactants, and separating from the resultant reaction mixture and recovering the bis-acetoacetyl o-tolidine thus produced.

5. Method for preparing bis-acetoacetyl benzidine, which comprises heating and reacting diketene with benzidine in solution in an inert solvent for the reactants, and separating from the resultant reaction mixture and recovering the bis-acetoacetyl benzidine thus produced.

6. Method for preparing a substituted acetoacetanilide, which comprises reacting diketene and a compound selected from aniline derivatives in which there is directly attached to a carbon atom of the benzene ring a radical selected from the group consisting of hydroxyl, nitro, amino and alkoxy radicals, in the presence of a solvent inert to the reactants, and recovering from the resultant reaction mixture the substituted acetoacetanilide thus produced.

7. Method for preparing a hydroxy acetoacetanilide, which comprises heating and reacting diketene and a primary amino phenol in the presence of a volatile solvent for the reactants which is inert thereto, and recovering from the resultant reaction mixture the hydroxy acetoacetanilide thus produced.

8. As a chemical compound, para-hydroxyacetoacetanilide, being a solid melting at between 88° and 90° C., and being soluble in alcohols, ketones, esters and water, and only slightly soluble in ethers and chlorinated solvents.

9. Method for producing an acetoacetyl aromatic amide, which comprises reacting diketene and a primary amine selected from the group consisting of the aromatic monoamines having more than six carbon atoms in their molecules, the aromatic polyamines, and the substituted aromatic amines in which there is directly attached to at least one carbon atom of a benzene ring a radical selected from the group consisting of hydroxyl, nitro, and alkoxy radicals, in the presence of a solvent inert to the reactants, and recovering from the resultant reaction mixture the acetoacetyl aromatic amide thus produced.

10. Method for preparing an acetoacetyl aromatic amide, which comprises reacting diketene and a para primary diamino derivative of an aromatic hydrocarbon having two benezene nuclei directly united in its molecule, in the presence of an inert solvent for the reactants, and thereafter recovering from the resultant reaction mixture the acetoacetyl aromatic amide thus produced.

11. Method for preparing an acetoacetyl aromatic amide, which comprises reacting diketene and a para primary diamino diphenyl, in the presence of an inert solvent for the reactants, and thereafter recovering from the resultant reaction mixture the acetoacetyl aromatic amide thus produced.

12. Method for preparing an acetoacetyl aromatic amide, which comprises reacting diketene and a para primary diamino dialkyl diphenyl, in the presence of an inert solvent for the reactants, and thereafter recovering from the resultant reaction mixture the acetoacetyl aromatic amide thus produced.

13. Method for preparing para-hydroxy acetoacetanilide, which comprises heating and reacting diketene and para amino phenol in the presence of a volatile solvent for the reactants which is inert thereto, and recovering from the resultant reaction mixture the para-hydroxy acetoacetanilide thus produced.

14. Method for producing an acetoacetyl aromatic amide, which comprises slowly introducing diketene in small successive portions into an agitated solution in an inert volatile solvent of a primary amine selected from the group consisting of the aromatic mono amines having more than six carbon atoms in their molecules, the aromatic poly amines, and the substituted aromatic amines in which there is directly attached to at least one carbon atom of a benzene ring a radical selected from the group consisting of hydroxyl, nitro, and alkoxy radicals, and recovering from the resultant reaction mixture the acetoacetyl aromatic amide thus produced.

ALBERT B. BOESE, Jr.